US009697469B2

(12) United States Patent
McMahon et al.

(10) Patent No.: US 9,697,469 B2
(45) Date of Patent: Jul. 4, 2017

(54) METHOD AND SYSTEM FOR GENERATING AND AGGREGATING MODELS BASED ON DISPARATE DATA FROM INSURANCE, FINANCIAL SERVICES, AND PUBLIC INDUSTRIES

(71) Applicants: Andrew McMahon, Westport, CT (US); Lawrence Wong, San Francisco, CA (US); Matthew Burriesci, Half Moon Bay, CA (US); Martin Lee, Sunnyvale, CA (US); Bo Han, San Francisco, CA (US)

(72) Inventors: Andrew McMahon, Westport, CT (US); Lawrence Wong, San Francisco, CA (US); Erin Culek, Chicago, IL (US); Matthew Burriesci, Half Moon Bay, CA (US); Martin Lee, Sunnyvale, CA (US); Bo Han, San Francisco, CA (US)

( * ) Notice: Subject to any disclaimer, the term of this patent is extended or adjusted under 35 U.S.C. 154(b) by 419 days.

(21) Appl. No.: 14/458,575

(22) Filed: Aug. 13, 2014

(65) Prior Publication Data
US 2016/0048766 A1 Feb. 18, 2016

(51) Int. Cl.
*G06N 5/04* (2006.01)
*G06N 99/00* (2010.01)
(Continued)

(52) U.S. Cl.
CPC .......... *G06N 5/047* (2013.01); *G06N 99/005* (2013.01); *G06Q 10/04* (2013.01); *G06Q 40/08* (2013.01);
(Continued)

(58) Field of Classification Search
None
See application file for complete search history.

(56) References Cited

U.S. PATENT DOCUMENTS 4,881,178 A 11/1989 Holland et al.
5,640,492 A 6/1997 Cortes et al.
(Continued)

OTHER PUBLICATIONS

International Search Report and Written Opinion for International Patent Application No. PCT/US2015/044872, dated Nov. 10, 2015; 9pgs.
Alpaydin, E. (Jan. 1992) "Multiple neural networks and weighted voting," in *Pattern Recognition, 1992. vol. II. Conference B: Pattern Recognition Methodology and Systems*, Proceedings, 11th IAPR International Conference on, IEEE, pp. 29-32.
Boser, B. E., et al., (Jul. 1992) "A training algorithm for optimal margin classifiers," in *Proceedings of the fifth annual workshop on Computational learning theory*, ACM, pp. 144-152.
(Continued)

*Primary Examiner* — Alan Chen
(74) *Attorney, Agent, or Firm* — Goodwin Procter LLP

(57) ABSTRACT

A method and system for making financial or medical decisions. The method comprises training sets of models using classification training with sets of data derived from segregated data sources. Overall weighting of each model within the sets of models are determined for each of the sub-datasets. The sets of models, the overall weighting of each model and a number of examples provided from the data for each of the datasets are transmitted to a central server over a communication network, wherein the central server is configured to determine the relative weights of each of the sets of models in the overall ensemble model based on the number of examples, combine the sets of models, receive new application data, and predict at least one of outcome variables, an uncertainty factor for the variables, and drivers of the outcome variables based on the new application data.

26 Claims, 8 Drawing Sheets

(51) Int. Cl.
*G06Q 10/04* (2012.01)
*G06Q 40/08* (2012.01)
*G06Q 10/06* (2012.01)
*G06Q 30/02* (2012.01)

(52) U.S. Cl.
CPC ..... *G06Q 10/0637* (2013.01); *G06Q 30/0201* (2013.01)

(56) References Cited

U.S. PATENT DOCUMENTS

| | | | |
|---|---|---|---|
| 6,128,608 | A | 10/2000 | Barnhill |
| 6,157,921 | A | 12/2000 | Barnhill |
| 6,427,141 | B1 | 7/2002 | Barnhill |
| 6,658,395 | B1 | 12/2003 | Barnhill |
| 6,714,925 | B1 | 3/2004 | Barnhill et al. |
| 6,882,990 | B1 | 4/2005 | Barnhill et al. |
| 7,318,051 | B2 | 1/2008 | Weston et al. |
| 7,542,959 | B2 | 6/2009 | Barnhill et al. |
| 8,095,483 | B2 | 1/2012 | Weston et al. |
| 8,731,977 | B1 | 5/2014 | Hardin et al. |
| 8,751,273 | B2* | 6/2014 | Pinto ............. G06F 17/50 705/7.11 |
| 2007/0016542 | A1* | 1/2007 | Rosauer ............. G06N 5/022 706/21 |
| 2008/0033899 | A1 | 2/2008 | Barnhill et al. |
| 2010/0256988 | A1 | 10/2010 | Barnhill et al. |
| 2011/0173116 | A1 | 7/2011 | Yan et al. |
| 2012/0239613 | A1* | 9/2012 | Danciu ............. G06Q 10/06 707/603 |
| 2014/0222737 | A1 | 8/2014 | Chen et al. |
| 2015/0235321 | A1* | 8/2015 | Unser ............. G06Q 40/08 705/38 |

OTHER PUBLICATIONS

Cortes, C. et al., (Sep. 1995) "Support-vector networks," *Machine learning*, 20(3), pp. 273-297.
Fan, R. E., et al. (Aug. 2008) "LIBLINEAR: A library for large linear classification," *The Journal of Machine Learning Research*, 9, pp. 1871-1874.
Figueroa, R. L., et al. (Feb. 2012) "Predicting sample size required for classification performance," BMC medical informatics and decision making, 12(1), p. 1.
Joachims, T. (Oct. 1999) "Making large scale SVM learning practical," Universitat Dortmund (17 pages).
Kato, Y., et al. (Jun. 1989) "An application of SVM: alphanumeric character recognition," in *IEEE IJCNN*, (abstract).
Platt, J. (Apr. 1998) "Sequential minimal optimization: A fast algorithm for training support vector machines," Microsoft Research, (21 pages).
Platt, J. C. (1999) "12 Fast Training of Support Vector Machines using Sequential Minimal Optimization," *Advances in kernal methods*, pp. 185-208.
Schapire, R. E., (Oct. 1998) "Boosting the margin: A new explanation for the effectiveness of voting methods," *Annals of statistics*, 26(5), pp. 1651-1686.
Zapranis, A., et al. (Jul. 2005) "Prediction intervals for neural network models," in *Proceedings of the 9th WSEAS International Conference on Computers*, World Scientific and Engineering Academy and Society (WSEAS), (7 pages).
U.S. Appl. No. 15/134,905 Systems and Methods for Failure Prediction in Industrial Environments, filed Apr. 21, 2016.

\* cited by examiner

METHOD AND SYSTEM FOR GENERATING AND AGGREGATING MODELS BASED ON DISPARATE DATA FROM INSURANCE, FINANCIAL SERVICES, AND PUBLIC INDUSTRIES

BACKGROUND OF THE INVENTION

Field of the Invention

The invention described herein generally relates to the use of learning machines to identify relevant patterns from disparate datasets, and in particular, to a method and system for aggregating models generated from data that are disparate, large, segregated, isolated, or do not share a fully overlapping feature set from a plurality of disparate data sources.

Description of the Related Art

Current financial product and insurance underwriting and risk assessment model development is limited to an individual institution's underwriting and risk assessment standards. For example, insurance companies each have their own criteria for modeling risk. In limited areas, cross industry cooperation exist where parties of an industry are able to share and query the shared data. Specific examples include consumer credit reporting agencies and insurance outcome reporting groups. However, a lack of cooperation on sharing data across company servers and firewalls inhibits the ability to model risk based on different features and criteria.

Some of the lack of cooperation is due to proprietary data and security concerns. In addition, modeling of data between common industry members can be difficult due to non-overlapping feature sets that occur due to each party having unique underwriting requirements. Not all data and outcomes maintained by all parties are stored in a common format, including fraud or distress data stemming from public information (e.g., news articles about plant closings or social media posts about criminal activities). The size of the data also provides a computational challenge to efficiently model, although models based on more data can be more accurate. Current monolithic modeling procedures produce one-dimensional predictions and do not account for additional predictive power that may be provided from other institutions.

There is thus a need for a computerized system to create models over a diverse group of data incompatible to be aggregated or commingled, protect the data with a computer security infrastructure, and transmit the models to a prediction server without transmission of the actual protected data while maintaining anonymity and data confidentiality.

SUMMARY OF THE INVENTION

A system and methods for generating and aggregating models from one or more of arbitrary datasets and features are provided. According to one embodiment, the method comprises choosing types of learning techniques for testing from models including support vector machines, tree-based techniques, artificial neural networks, and other supervised or unsupervised machine learning algorithms. A family of feature sets is chosen within each dataset that provide predictive ability for a final modeler, and sub-datasets are chosen from each larger dataset, with replacement, to enable learning across an entire dataset too large to be modeled efficiently as a single dataset. The method further comprises testing each model on the dataset. Testing includes utilizing a test set of data held out from each sub-dataset of each dataset to determine accuracy, discarding models with insufficient predictive power, and determining overall weighting of the models within each dataset. Each model set is transmitted along with weights to produce an end classifier. The end classifier summarizes and combines the transmitted models to produce outcome variables and an uncertainty factor for the variables. The method further comprising performing a sensitivity analysis of the combined models to determine which values of which features are the largest drivers of a given outcome variable.

In another embodiment, the method comprises receiving at one or more modeling servers, data from underwriting databases of a plurality of underwriting parties, the data including information from existing life insurance policies. For each of the plurality of underwriting parties, at least one dataset and sub-datasets of the at least one dataset from the data are generated by the modeling servers. Sets of models of a given learning technique are trained for each of the sub-datasets via the modeling servers, and overall weighting of each model within the sets of models are determined for each of the sub-datasets by the modeling servers. The method further comprises transmitting to a prediction server over a communication network, the sets of models, the overall weighting of each model and a number of examples provided from the data for each of the datasets, the prediction server configured to determine relative weights of each of the sets of models of the ensemble based on the number of examples, combine the sets of models into an ensemble model, receive new application data from underwriting servers, and predict at least one of outcome variables, an uncertainty factor for the variables, and drivers of the outcome variables based on the new application data.

According to one embodiment, generating at least one dataset and sub-datasets from the data for each of the plurality of underwriting parties includes at least one of choosing sub-datasets from the datasets with replacement, and choosing a family of feature sets within each dataset that provide predictive power for the combined sets of models. The given learning technique for each of the datasets may be selected from a selection of support vector machines, tree-based techniques, artificial neural networks, and random forest learning models, or other supervised, or even unsupervised learning methods.

In one embodiment, training the sets of models includes testing each model utilizing a test set of features omitted from each sub-dataset of each dataset, and discarding models with insufficient predictive power based on the testing. Generating at least one dataset and sub-datasets of the at least one dataset may include selecting sets of features based on one of guaranteed uniformity of feature sets across the datasets, and a lack of a large number of data bearing features. According to another embodiment, generating at least one dataset and sub-datasets of the at least one dataset may include selecting sets of features using iterative feature addition (adding features to a model until there is less marginal improvement in predictive ability than a predetermined threshold) or recursive feature elimination.

In one embodiment, the overall weighting of each model within the sets of models for each of the sub-datasets is related by a power law to a number of records represented in each sub-dataset of a given dataset. In another embodiment, the overall weighting of each model within the sets of models for each of the sub-datasets is related to its predictive power as determined by assignment of weights described by the accuracy the models on a test set.

The outcome variables may be one of categorical variables, continuous outcome variables, and binary variables.

In one embodiment, the uncertainty factor may be determined by taking an arithmetic mean of continuous outcome variables and evaluating a function based on at least one of variance, standard deviation, outliers, range, distribution, and span between given percentiles. According to another embodiment, the uncertainty factor may be determined by converting at least one categorical variable into continuous outcome variables, taking an arithmetic mean of the continuous outcome variables, and evaluating a function of at least one of variance, standard deviation, outliers, range, distribution, or span between given percentiles. The method may further include calculating the mode or median of the at least one of outcome variables.

In one embodiment, the central server is further operable to perform a sensitivity analysis using the combined sets of models to determine which features are the largest of the drivers of the outcome variables. A further embodiment includes perturbing a given outcome variable by one or more of a preset, human-selected, and algorithmically-selected amount or number of gradations, and determining an effect of the perturbation on the outcome variables.

The data may be pre-processed to anonymize information that could identify a person or entity. Another embodiment includes normalizing the data prior to or during the generation of the at least one dataset and sub-datasets of the at least one dataset. Yet another embodiment may include cleaning the data to remove and correct potentially erroneous data. In a further embodiment, cleaning the data includes augmenting the data with additional information. According to an alternative embodiment, cleaning data includes replacing missing data fields with values including one of a mean of values for the missing data fields in a dataset, and randomly selected values for the missing data fields from a given sub-dataset.

In one embodiment, the method includes identifying at least one of missing, erroneous, and poorly defined data points from the data, and training the sets of models based on the identification of the data points from the data are at least one of missing, erroneous, and poorly defined. The data may be encrypted or hashed. According to one embodiment, the data may include data produced by wearable technologies. The training may also include data produced by public and social networking data sources.

The sets of models that make up an ensemble, outcome variables, uncertainty factors, and drivers may be used to inform one of an offer of credit, an offer of insurance, marketing of financial or insurance products to a consumer, marketing of financial or insurance products and activating features of those products to an existing customer, fraud detection during or after an evaluation of an application, and an offer of incentives or dividends for behavior after an extension of credit or insurance. In another embodiment, the sets of models, outcome variables, uncertainty factors, and drivers may be used to target marketing of financial or insurance products to a specific class or type of customer.

According to one embodiment, the method further includes generating the uncertainty factor based on a lack of information about a customer or potential risks. The uncertainty factor may be an input to a decision on whether or not to reject a life insurance application. In another embodiment, the uncertainty factor may be an input into a decision on whether or not to do additional underwriting processes on an applicant for a life insurance application. In yet another embodiment, the uncertainty factor may be used as an input to credit or insurance underwriting. The uncertainty factor may also be represented on a bar chart to illustrate the uncertainty factor, and may also be represented as a range on a bar or column representing a score.

The system comprises one or more computing devices configured to receive data from a single or multiple underwriting parties, the data including information from existing life insurance policies, generate at least one dataset and sub-datasets of the at least one dataset from the data for each of the plurality of underwriting parties, train sets of models of a given learning technique for each of the sub-datasets, determine overall weighting of each model within the sets of models for each of the sub-datasets, and transmit to a central server over a communication network, the sets of models, the overall weighting of each model and a number of examples provided from the data for each of the datasets. The system further comprises the central server configured to determine relative weights of each of the sets of models based on the number of examples and combining the sets of models into an ensemble model that can produce at least one of outcome variables, an uncertainty factor for the variables, and drivers of the outcome variables.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
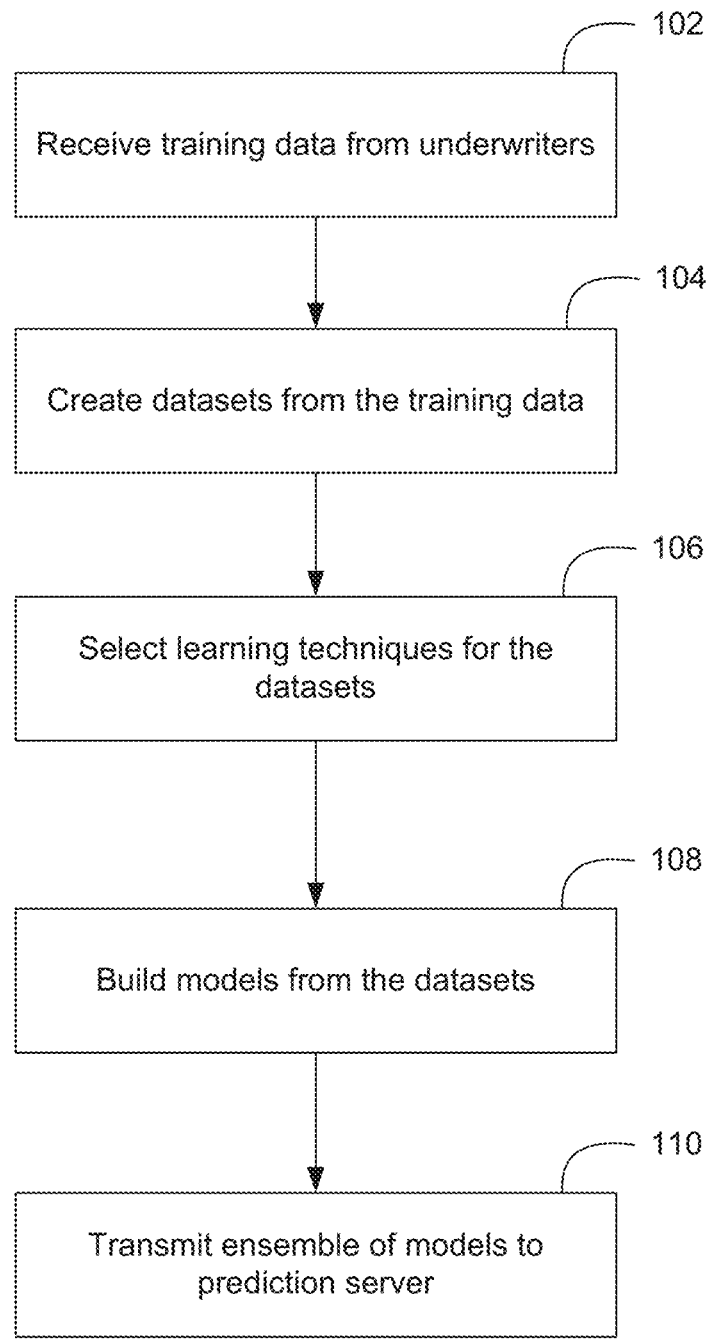
FIG. 1 illustrates a flowchart of a method for generating an ensemble model according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

A system and method for predicting certain financial, insurance or health outcomes are provided according to embodiments of the present invention. The predicted outcome may be used as a tool by underwriters for applications of insurance or credit to determine risk similar to how FICO scores may be used to evaluate the creditworthiness of applicants for loans. The method includes generating models for identifying which of a set of categories (e.g., underwriting classification in terms of mortality, morbidity, health outcomes, and credit and fraud risks) applicants for an insurance (e.g., life, annuity, health, home, automobile, accident, business, investment-orientated, etc.) or financial product (credit, loans, etc.) belong on the basis of a training set of data. Training data may be formed from a plurality of datasets originating from a plurality of underwriters where one or more of the datasets may include arbitrary or disparate datasets and outcomes that cannot be commingled or aggregated. The training data may be used to train machine learning algorithms to transform the raw data (e.g., data that has not been modified or kept in its original format) into a plurality of models that can be used to evaluate and determine an outcome or score of applicants for insurance or financial products (e.g., underwriter classification, score, risk drivers, predicted life expectancy or predicted years of life remaining).

FIG. 1 illustrates a flow diagram of a method for generating an ensemble model according to an embodiment of the present invention. Training data is received from a plurality of underwriters, step 102. According to one embodiment, the training data includes information from existing or past policies such as personal identification information, date or birth, original underwriting information, publically purchasable consumer data, prescription order histories, electronic medical records, insurance claims, motor vehicle records, and credit information and death or survival outcomes. According to one embodiment, training data from each of the underwriters may be uniquely formatted and include disparate types of information.

The training data can be received from servers and databases from underwriting parties (e.g., an insurance or financial company) and processed by a modeling engine without proprietary data necessarily leaving the underwriters' facilities or shared with other underwriting parties. In particular, a modeling architecture is provided that allows use of a dataset from the servers of the underwriters without directly transmitting that dataset outside their facilities. Rather, models created from the datasets may be used and shared among the underwriters. Usage of anonymous and synthesized underwriting learning allows anonymized insights, error correction, fraud detection, and provides a richer feature set then a single dataset. Training data may also be retrieved and extracted from prescription databases, consumer data sources, credit data sources, and from public web queries. Modeling engines are operable to process and generate models from training data originating from a variety of servers, databases, and other electronic data sources.

The data may be transmitted over a network and received by a modeling engine on a local server, which may be located behind the underwriters' corporate firewall or at a remote server or computing device designated by or to the underwriters. Servers may vary widely in configuration or capabilities, but a server may include one or more central processing units and memory, the central processing units and memory specially configured (a special purpose computer) for model building or processing model data according to embodiments of the present invention. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. Communications and content stored and/or transmitted between the servers may be encrypted using asymmetric cryptography, Advanced Encryption Standard (AES) with a 256-bit key size, or any other encryption standard known in the art. The network may be any suitable type of network allowing transport of data communications across thereof. A network may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN), or wide area network (WAN) connection, wire-line type connections, wireless type connections, or any combination thereof.

Datasets as well as sub-datasets or feature sets within each dataset may be created from each of the training data retrieved from the underwriting parties including disparate kinds of data and features, some of which may overlap and/or differ in formats, step 104. Learning techniques are selected for each of the plurality of datasets by a modeling engine, step 106. Choices include, but are not limited to support vector machines (SVMs), tree-based techniques, artificial neural networks, random forests and other supervised or unsupervised learning algorithms. Further description and details of these learning techniques are described in further detail in U.S. Patent Application Publication No. 2006/0150169, entitled "OBJECT MODEL TREE DIAGRAM," U.S. Patent Application Publication No. 2009/0276385, entitled "ARTIFICIAL-NEURAL-NETWORKS TRAINING ARTIFICIAL-NEURAL-NETWORKS," U.S. Pat. No. 8,160,975, entitled "GRANULAR SUPPORT VECTOR MACHINE WITH RANDOM GRANULARITY," and U.S. Pat. No. 5,608,819, entitled "IMAGE PROCESSING SYSTEM UTILIZING NEURAL NETWORK FOR DISCRIMINATION BETWEEN TEXT DATA AND OTHER IMAGE DATA," which are herein incorporated by reference in their entirety.

Models are generated from the datasets using the selected learning techniques, step 108. Generating models includes building sets of models for each of the datasets. Features from the datasets may be selected for model training. A model may comprise data representative of a computing system's (such as a modeling engine or server) interpretation of training data including certain information or features. A family of feature sets within each dataset may be selected using, for example, iterative feature addition, until no features contribute to the accuracy of the models beyond a particular threshold. To improve the overall model, certain features may be removed from the set of features and additional models may be trained on the remaining features. Training additional models against the remaining features allows for the determination of an optimal set of features that provide the most predictive power when the removed feature sets may not be available in other datasets. Examples of most predictive features may include location, date of birth, type of medications taken, and occupation.

According to embodiments of the present invention, ensemble learning (e.g., by a special-purpose computing device such as a modeling engine or server) is employed to use multiple trained models to obtain better predictive performance than could be obtained from any individual constituent trained model. Ensemble learning combines multiple hypotheses to form a better hypothesis. A given ensemble model can be trained and then used to make predictions. The trained ensemble represents a single hypothesis that is not necessarily contained within the hypothesis space of the models from which it is built. Thus, ensembles can be shown to have more flexibility in the functions they can represent. Ensembles are capable of yielding better results when there is a significant diversity among the models. Therefore, disparate datasets from the plurality of underwriting parties are ideal in providing diversity among the models the ensembles combine. Furthermore, the exclusion of features, as described above, can provide this diversity.

A plurality of models may be generated for each of the plurality of datasets as well as for each individual dataset. For example, a plurality of models may be generated from a given feature set where each of the plurality of models is trained using unique feature combinations from the feature set. Generating the models may further include testing the models, discarding models with insufficient predictive power, and weighting the models. That is, the models may be tested for their ability to produce a correct classification greater than a statistical random chance of occurrence. Based on "correctness" or predictive ability from the same dataset, the models may be assigned relative weightings that then affect the strength of their input in the overall ensemble model.

The models are transmitted via network or physical media to a prediction server or an engine on a central server including a disk drive, transistor-based media, optical media, or removable media, step 110. The models include a combination of disparate model types (generated from the selected learning techniques). Results from the models may be weighted and combined or summarized into an end classifier to produce the outcome. The prediction server is configured to be able to utilize the ensemble model (the interpretation data generated by modeling engines or servers) to predict an outcome including a composite score, continuous or categorical outcome variables, uncertainty factors, ranges, and drivers for application queries. Predicted outcomes from the prediction server may be used to inform marketing of financial or insurance products (or activating features of those products) to a new or existing customer, target marketing of financial or insurance products to a specific class or type of customer, inform fraud detection during or after an evaluation of an application, and inform the offer of incentives or dividends for behavior after the extension of credit or insurance. Additionally, sensitivity analysis of the ensemble model may be performed to determine which features are the largest drivers of a predicted outcome. A sensitivity analysis includes varying certain features, such as, body mass index (BMI), number of accidents, a smoker or non-smoker, etc., by plus or minus a given range of values for continuous variables, toggling a value for binary, or permuting categorical variables and re-running the ensemble models. Features with the greatest influence on the predict outcome can be identified based on differences in the re-running of the ensemble model.

Figure 2:
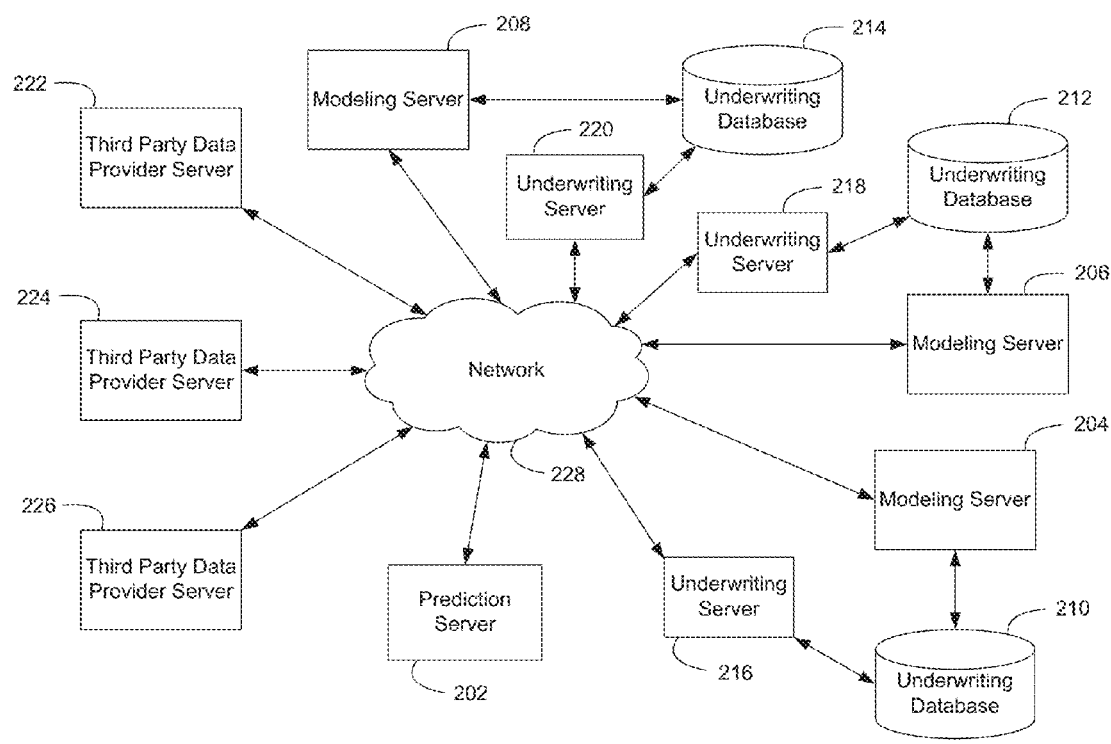
FIG. 2 illustrates a computing system according to an embodiment of the present invention.

FIG. 2 presents a computing system according to embodiments of the present invention. The computing system comprises prediction server 202 communicatively coupled to modeling server 204, modeling server 206, and modeling server 208 via network 228. The modeling servers may create sets and subsets of features from the training data based on the data stored within the underwriting databases. That is, modeling server 204 creates training data from underwriting database 210, modeling server 206 creates training data from underwriting database 212, and modeling server 208 creates training data from underwriting database 214.

The data stored in underwriting databases 210, 212, and 214 may include information from existing or past policies such as personal identification information, date or birth, original underwriting information, purchasable consumer, credit, insurance claims, medical records data, and death or survival outcomes. Data stored in underwriting databases 210, 212, and 214 may also be unique or proprietary in form and in content among each underwriting database. Some of the underwriting servers, modeling servers and underwriting database may be co-located (e.g., a corporate location) and protected behind a firewall and/or computer security infrastructure. For example, underwriting server 216, modeling server 204, and underwriting database 210 may be located in first common location, while underwriting server 218, modeling server 206, and underwriting database 212 may be located in a second common location and underwriting server 220, modeling server 208, and underwriting database 214 may be located in a third common location. In other embodiments, one or more of the underwriting servers, modeling servers and underwriting database may be located remotely from each other.

Models can be generated by the modeling servers 204, 206, and 208 from the training data (learning from the training data). A given modeling server is operable to generate ensemble models from the sets and subsets of features created from the training data and determine relative weightings of each model. The modeling servers may be further operable to test the ensemble models for correctness. The relative weightings may be assigned based on relative correctness of the ensemble models. Prediction server 202 may receive or retrieve a group of models from each of the modeling servers along with the relative weightings.

Utilizing the ensemble of models, the prediction server 202 is able to provide predictions for new insurance applications. Queries may be submitted to the prediction server 202 from any of underwriting server 216, 218, or 220. A query may include insurance application data such as personal identifying information (such as name, age, and date of birth), policy information, underwriting information, an outcome variable for life expectancy as calculated from the underwriters' decision, and actuarial assumptions for a person in an underwriting class and of that age. Each of the groups of models may be given an additional weighting among each group received from the modeling servers. In other words, an group of models from modeling server 204 may be assigned a first weighting, an group of models from modeling server 206 may be assigned a second weighting, and an group of models from modeling server 208 may be assigned a third weighting. The weightings assigned to each group of models may be based on, for example, the number of features or volume of training data used to create the group of models.

The insurance application data from a query may be entered into each of the models in the ensemble of models to provide an outcome prediction. The outcome prediction may include outcome variables associated with mortality, morbidity, health, policy lapse, and credit and fraud risks, or suitability for marketing campaigns. In addition, third party and public information may be collected from third party server 222, third party server 224 and third party server 226 and used to influence or augment results of the ensemble of models. Third party information may include prescription history, consumer purchasing data, and credit data. Public information includes for example, "hits" associated with applicants' names on the Internet, driving records, criminal records, birth, marriage and divorce records, and applicants' social network profiles (e.g., LinkedIn, Facebook, Twitter, etc.). Alternatively, one or more of the third party and public information may be included in the data stored in underwriting databases 210, 212, and 214 and included in the generation of the ensemble model.

Figure 3:
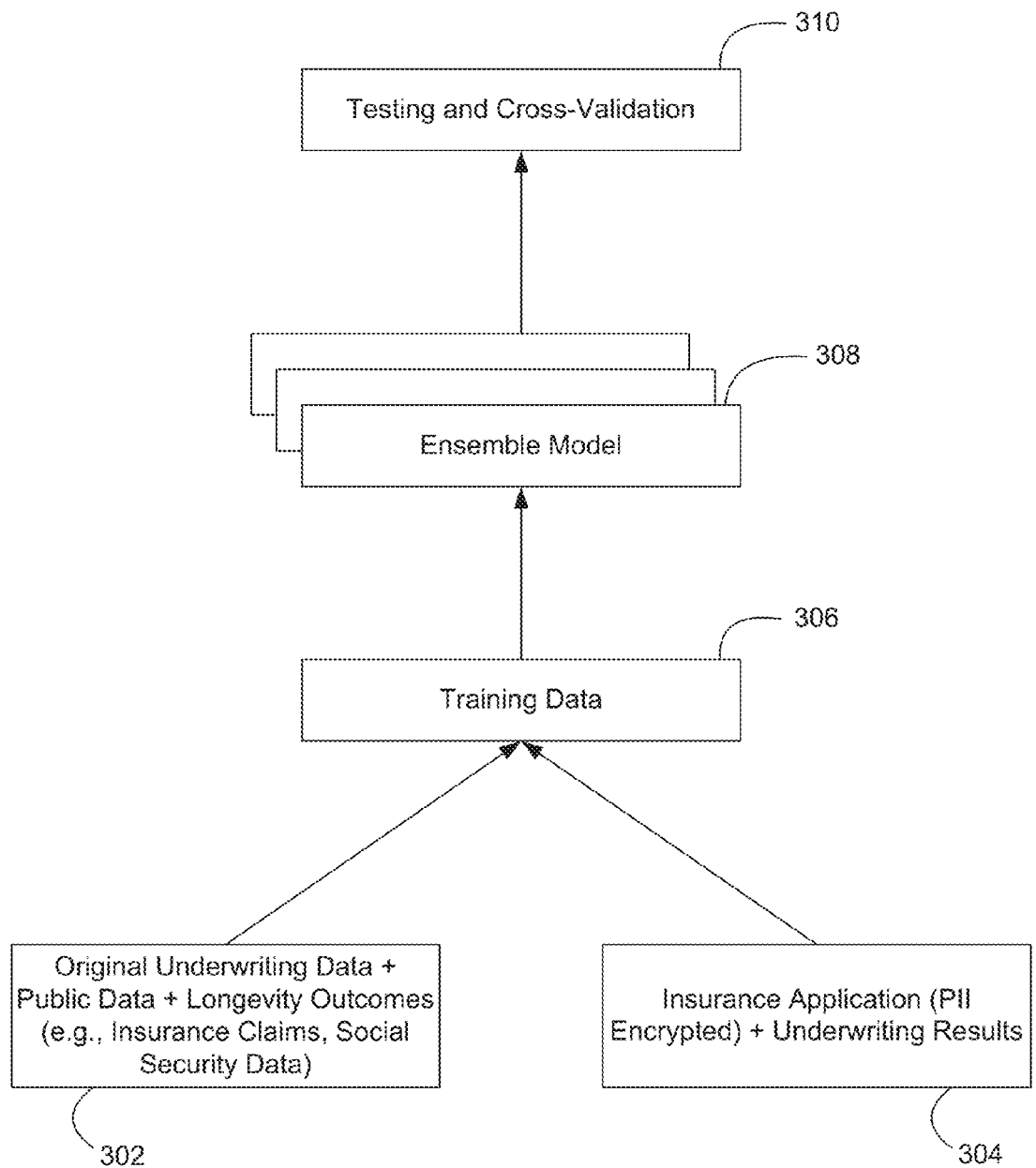
FIG. 3 illustrates a data flow diagram of a method for generating an ensemble model according to an embodiment of the present invention.

Referring to FIG. 3, data 302 received by the modeling engine includes, but not limited to, information from existing or past policies, original underwriting data, public data, actual (or longevity) outcomes, a Death Master file (e.g., Social Security Death Index, life insurance claims data) from servers of the underwriting parties, medical records, driving records (e.g., Department of Motor Vehicles), prescription history, and other Health Insurance Portability and Accountability Act (HIPAA) protected data. The modeling engines may be located within the underwriting parties' firewalls or with the facilities of the servers storing data 302. Original underwriting data may include information associated with previous policies, information associated with the underwriting of the policies, publically purchasable consumer data, and age at death (or current survival) as an outcome variable. Other sources of data may include data produced by wearable technologies, collaborative knowledge bases (e.g., Freebase), and social networking/media data associated with an individual (e.g., applicant). Several features of an individual may be gleaned and inferred from data 302. For example, it may be determined that an applicant for life insurance is living a healthy lifestyle based on purchases of health books, ordering healthy food, has an active gym membership, has a health and fitness blog, runs two miles every day, and posts exercising activities on social networking websites. Data 302 may be pre-processed to anonymize some or all information that could identify a person or entity. The data may also be normalized prior to or during processing cleaned to remove or correct potentially erroneous data points. Data 302 can also be augmented with additional information prior to or during processing, where missing data fields are replaced with a value, including the mean of the field for a set, selected randomly, or selected from a subset of data points.

A plurality of learning techniques can be selected for learning on datasets created from data 302. The data is used as training data 306 for model learning. Training data 306 comprises a plurality of datasets created from data 302. A given dataset includes features selected from data received from a given underwriting party. Models developed from each underwriting parties' data contribute to the ensemble model 308. That is, the ensemble model 308 are an aggregate of models generated from data of a plurality of underwriting parties. In addition, multiple types of underlying models may be produced from the plurality of datasets to comprise ensemble model 308.

Ensemble model 308 can be built from feature sets by modeling engines on one or more servers (e.g., as designated and located by the underwriting parties). A family of feature sets may be chosen within each dataset for modeling. Thus, a plurality of ensemble model 308 may be generated for each of the plurality of datasets as well as for each individual dataset. The set of features may be selected using iterative feature addition or recursive feature elimination. Sets of features may also be selected based on guaranteed uniformity of feature sets across all datasets or lack of a large number of data bearing features. Thus, optimal models can be produced using particular data subset(s). For example, a plurality of models may be generated from a given dataset where each of the plurality of models is trained using unique feature combinations from the given dataset. This allows for reducing problems related to overfitting of the training data when implementing ensemble techniques.

Overfitting generally occurs when a model is excessively complex, such as having too many parameters relative to the number of observations. In particular, a model is typically trained by maximizing its performance on some set of training data. However, its efficacy is determined not by its performance on the training data but by its ability to perform well on test data that is withheld until the model is tested. Overfitting occurs when a model begins to memorize training data rather than learning to generalize from trend. Bootstrap aggregating (bagging) or other ensemble methods can produce a consensus decision of a limited number of outcomes. In order to promote model variance, bagging trains each model in the ensemble using a randomly drawn subset of the training set.

In one embodiment, a feature condensation may be used where certain features may be summarized. For instance, detection of the type of prescriptions taken by an individual and classifying them into high, medium, and low risk, summing the occurrences of certain phrases synonymous to "accident" on a driving record of the individual, and extracting critical features from words or images on a social networking profile page of the individual, may be performed to synthesize a smaller number of critical features that have a great influence on evaluating mortality and morbidity risk from a much larger set of underlying observed features. Optionally, a subset of data can be used to weight the models produced from different datasets. Due to the computationally intensive nature of learning, the family of feature sets from the dataset may be distributed to multiple servers for modeling. For large datasets, sub-datasets may be used instead to build models. The sub-datasets may be created by sampling (with replacement) the dataset.

Testing and cross-validation 310 may include testing each model on the dataset by utilizing a test set of data points held out or omitted from the training dataset to determine accuracy, discarding models with insufficient predictive power, and determining overall weighting of the models within each dataset. In the initial training of ensemble model 308, a set of features may be removed from a given sub-dataset, thereby removing a subset of data bearing features, and additional models trained using the remaining features. Training additional models of the ensemble against these subsets of the total feature set allows for a broader set of models to be created and evaluated. According to another embodiment, random subsets of a feature set can be eliminated and iterative feature addition may be repeated to obtain a diverse set of models. Cross-validation includes a model validation technique for assessing how the results of modeling will generalize to an independent data set to estimate how accurately the ensemble model will perform in practice. A dataset may be defined to test the ensemble model to limit problems like overfitting and provide an insight on how the models can correctly predict outcomes for an unknown dataset, for example, from a real underwriting application. The cross-validation may include partitioning a dataset into complementary sub-datasets, performing analysis on one sub-dataset, and validating the analysis on another sub-dataset (the validation/test set). Multiple rounds of cross-validation can be performed using different partitions and the validation results may be averaged over the rounds. The weighting of each model within each dataset may be related to the number of records represented in each sub-dataset of a dataset that gave rise to that model by a power law, or related to its predictive power as determined by regression or another machine-driven assignment of weights utilizing a set of test data that can be used by all models to be weighted Sets of models (a set corresponding to each dataset) may be transmitted from the modeling building engines and stored on a prediction engine located on a central server(s). The prediction engine may provide a classifier comprising the ensemble of models to aid in underwriting life insurance applications including the monitoring of underwriting decisions quality and the updating of the classifier over time. The classifier is operable to estimate or predict outcomes related to insurance claim frauds, medical issues, investment risk, accident likeliness, etc. Predicted outcomes from the prediction server may be used to inform marketing of financial or insurance products to a consumer or existing customer, target marketing of financial or insurance products to a specific class or type of customer, inform fraud detection during or after an evaluation of an application, and inform an offer of incentives or dividends for behavior after the extension of credit or insurance. Ensemble model 308 may be shared among the plurality of underwriting parties without necessarily disclosing each other's underlying data or identities. In an alternative embodiment, a given underwriting party may have customized models that are unique from the shared ensemble model.

Queries may be submitted to the prediction engine to evaluate new applications or renewals. A query comprises insurance application data 304. Insurance application data 304 may include encrypted personal identifying information (such as name, age, and date of birth), policy information, underwriting information, an outcome variable for life expectancy as calculated from the underwriters' decision, and actuarial assumptions for a person in an underwriting class and of that age. Values from insurance application data 304 may be entered into the ensemble model. The prediction engine is operable to run the ensemble model with the insurance application data 304 and results from the ensemble model may be summarized and combined (regardless of type of the underlying models) to produce outcome scores, variables, and an uncertainty factor for those variables. The insurance application data 304 (including underwriter findings) may also be used by the modeling engines for training additional models, as the actuarial assumptions and the underwriting outcomes describe an outcome variable, life expectancy. This may occur periodically, e.g., daily, weekly, monthly, etc.

The variables may be ordered outcome variables (continuous and binary) and categorical variables such as years until death, years until morbidity, risk classes, potential fraud risk, and potential risk of early policy lapse. Ordered outcome variables may be assigned numerical scores. There may be a certain number of models that produce favorable outcome values or predictions, a certain number of models that produce unfavorable outcome values or predictions, and a certain number of models that produce inconclusive outcome values or predictions. The mean and variance (or standard deviation), median, or the mode of those numerical scores (or variables) can be determined to create a voting mechanism based on dispersion of risk classes and weights. According to one embodiment, sets of models that show more accurate predictions are given greater weight over other sets of models. In an exemplary embodiment, the outcome variables with the most votes are identified and can be used to determine an underwriting decision for a particular application query.

Lack of information, about a customer or potential risk, can be used to generate an uncertainty factor. Uncertainty factors are used to compensate for a deficiency in knowledge concerning the accuracy of prediction results. In risk assessment, the uncertainty factor is set to enable risk assessment while avoiding underestimation of the risk due to uncertainties so that risk assessment can be done with a sufficient safety margin. As this value gets higher, the risk assessment becomes less reliable. According to one embodiment, the arithmetic mean of ordered outcome variable sets produced by models may be taken to provide a high granularity prediction, and the variance of those same sets provides a measure of uncertainty. In particular, an arithmetic mean may be taken of any continuous variables and the variance, standard deviation, outliers, range, distribution, or span between given percentiles, may be used to calculate an uncertainty factor. In another embodiment, categorical variables may be converted into continuous variables via a conversion formula, that of which an arithmetic mean of the continuous variables may then be taken and their variance, standard deviation, outliers, range, distribution, or span between given percentiles, may be used to calculate the uncertainty factor.

The uncertainty factor may be an input to a decision on whether or not to reject an application. The uncertainty factor may suggest that additional underwriting intervention on an applicant may be necessary. The uncertainty factor may be represented on a bar chart or a dot plot to illustrate the uncertainty factor. The uncertainty factor may also be used as an input to credit or insurance underwriting.

The prediction engine may further perform a sensitivity analysis of the model group used to determine which values of which features are the largest drivers of the outcome. Feature variables such as BMI, driving history, being a smoker or non-smoker, and a history of late bill payments may greatly affect outcomes produced by the overall ensemble model. Each feature variable associated with an individual query may be varied and used to re-run the ensemble model to produce different outcomes variables. The feature variables may be perturbed by a preset, underwriter/user-selected, or algorithmically-selected amount or number of gradations to determine the effect of the perturbation on the final outcome variable(s). Features that produce the greatest change in the outcome variables when varies can be identified to an end-user (e.g., underwriter) to indicate the drivers. For example, features can be perturbed in each direction by 10% of the difference between the cutoff values for the 25th and 75th percentiles for continuous variables or ordered discrete variables with more than 20 values. All others (including binaries) may be perturbed one value, if available. Perturbations (e.g., top five) with the largest changes on the mean value of the set of models may be identified and reported. The sensitivity analysis can be used to determine the certainty of the ensemble model and/or to communicate drivers of a credit or insurance decision to a requesting body (a querying underwriter).

Figure 4:
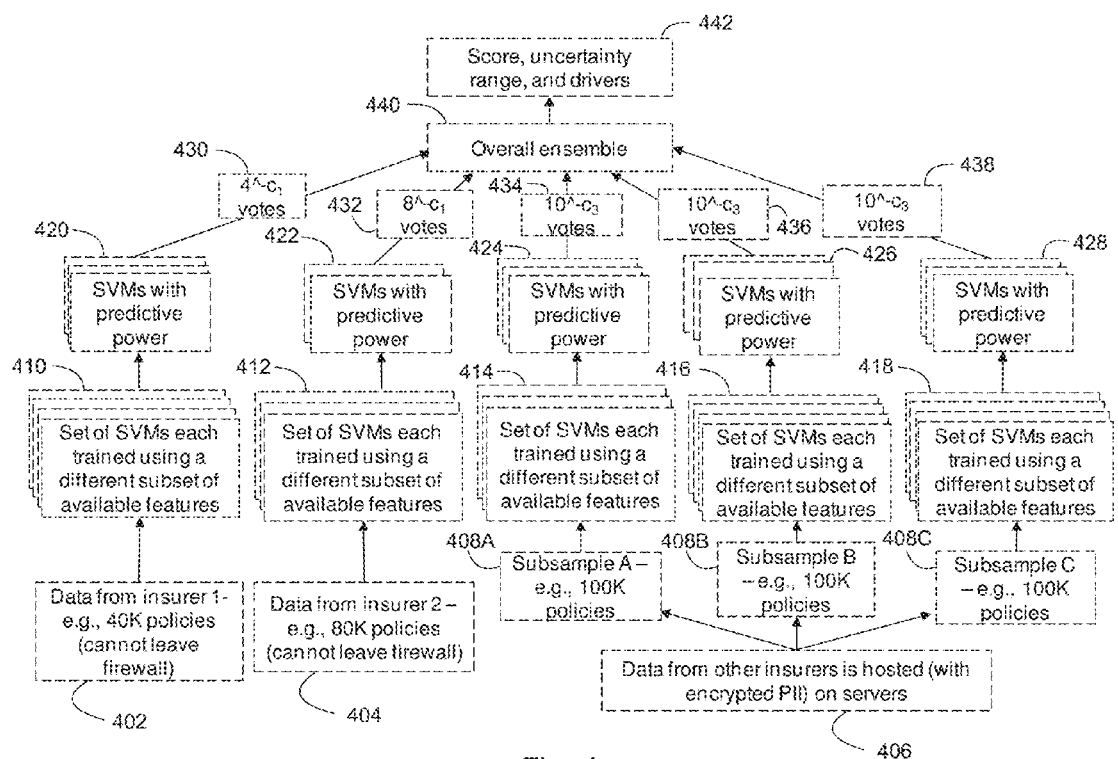
FIG. 4 illustrates an exemplary data flow diagram of a method for generating a classifier based on an ensemble model according to an embodiment of the present invention.

FIG. 4 illustrates a data flow diagram of a method for generating a classifier based on an aggregate of models according to an embodiment of the present invention. The aggregated models are usable to develop a classifier for predicting outcomes associated with insurance and financial underwriting. Individual models can be learned from datasets comprising a plurality of data sampled from data 402, 404 and 406. The data 402, 404, and 406 may include information of policies (personal identification information, date or birth, original underwriting information, publically purchasable consumer data, and death or survival outcomes) and any other information associated with the policies or applicants of the policies. Data 406 comprises larger datasets, for example, data including over 100,000 policies. Sub-datasets may be created for larger datasets or datasets may be restricted to sub-datasets defined by the need to not commingle certain sub-datasets to enable learning across larger datasets too large to train on a server or is substantially larger relative to other smaller datasets. The sub-datasets may be created by sampling (e.g., random with replacement) from the larger datasets.

One or more of machine learning techniques can be chosen from a selection including SVM, tree-based techniques, and artificial neural networks for learning on the datasets.

In the illustrated embodiment, SVMs are selected for learning on the datasets. Groups of SVMs 410, 412, 414, 416, and 418 are trained based on a family of feature sets within each of datasets from a first insurer data 402 and datasets of a second insurer data 404, and from subsample data 408A, 408B, and 408C (subsample of datasets) resulting from the need to reduce the size of data used in any single computation. A family of feature sets may be chosen within each dataset that provide predictive power for the final modeler. Sets of information-containing features may be chosen using iterative feature addition or another method, with elimination of features from the set under consideration and retraining used to make a more diverse set of models for the ensemble.

Each of SVMs 410, 412, 414, 416, and 418 are tested for accuracy. Accuracy may be determined by identifying models that predict correct outcomes. A test set of data may be omitted or held out from each sub-dataset of each dataset to determine accuracy. Low marginal predictive power may be judged based on a model's inability to produce the correct classification more often than, for example, twice the rate produced expected from random chance. The testing may also identify overfitting by determining whether models are less accurate on the test dataset than the training dataset. Models with insufficient predictive power or that show overfitting can be discarded.

Overall weighting of each model within each dataset may be determined. Each model set (SVMs with predictive power 420, 422, 424, 426, and 428) are transmitted to a prediction server/engine along with the weights of each model within each dataset and the number of examples in each feature set to form overall ensemble 440. Voting weights 430, 432, 434, 436, and 438 can be assigned to SVMs with predictive power 420, 422, 424, 426, and 428, respectively. The voting weights may be scaled to amount of data input into the model building (the number of examples used in a model). Relative weights of each of the sets of models may be determined based on the number of examples provided from the training data for each of the datasets. Alternatively, a separate dataset or sub-dataset may be utilized to assign the relative weights of models from different datasets. In another embodiment, sets of SVMs that show more accurate predictions are given greater weight over other sets of SVMs.

Prediction server/engine comprises an end classifier that summarizes and combines overall ensemble 440. Application queries (such as for insurance or financial product applications) may be submitted to the prediction engine for classification and analysis of the application. An application query may include information associated with an insurance or financial product application and underwriting results. The prediction engine is operable to extract features from the application information and run the overall ensemble 440 with the features to produce outcome variables and an uncertainty factor for the outcome variables. Scores may be assigned to various outcome variables produced from overall ensemble 440 such as a life score that predicts a year range of life expectancy. An uncertainty range is produced to indicate the quality of classification of the outcome variable. Drivers of a predicted outcome may also be determined by performing a sensitivity analysis of the combined models to determine which values of which features are the largest drivers of a given outcome.

Figure 5:
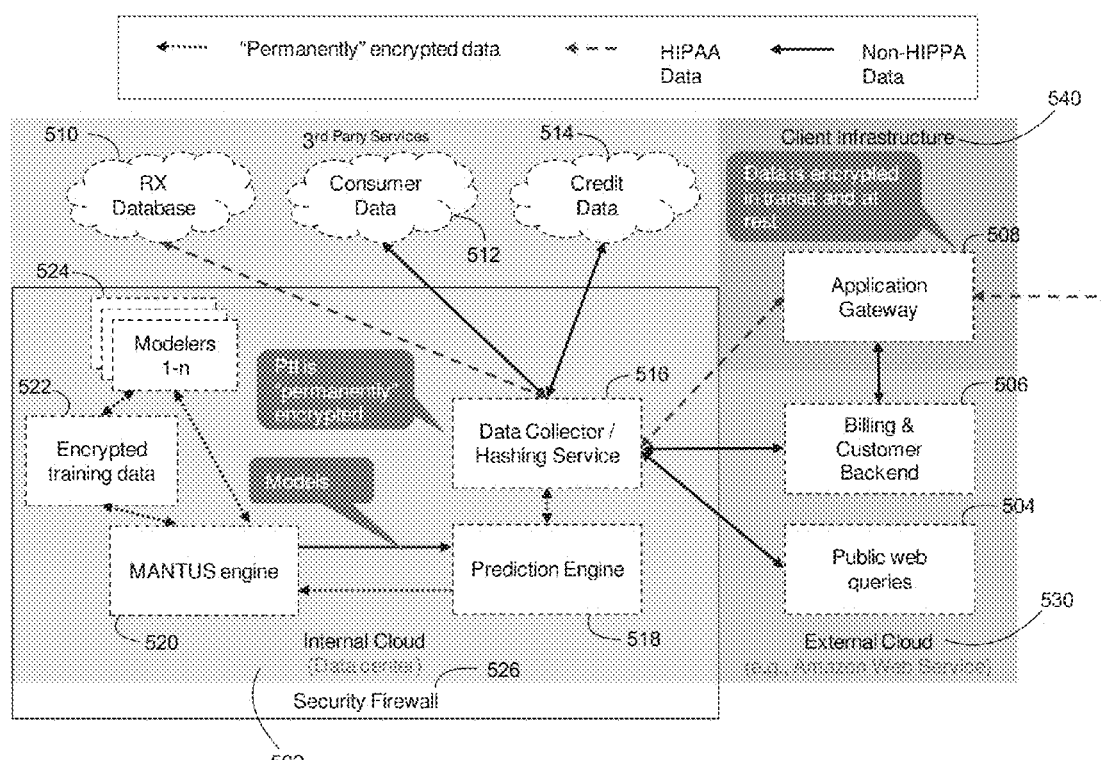
FIG. 5 illustrates a computing system according to an embodiment of the present invention.

FIG. 5 presents a computing system according to an embodiment of the present invention. The computing system comprises an internal cloud 502, external cloud 530, and client infrastructure 540. Internal cloud 502 may be hosted on one or more servers that are protected behind a security firewall 526. In the illustrated embodiment, internal cloud 502 is configured as a data center and includes MANTUS (mutually anonymous neutral transmission of underwriting signals) engine 520. MANTUS engine 520 is configured to receive encrypted training data 522.

Encrypted training data 522 includes features extracted from policies provided by a plurality of underwriting parties. The policies comprising personal identifying information, date or birth, original underwriting information, publically purchasable consumer data, and death or survival outcomes. Modelers 524 are capable of learning from the encrypted training data 522 to train models. Trained models may be transmitted to prediction engine 518 to form an end ensemble classifier for analyzing new applications and predicting outcomes. The outcomes may include variables, uncertainty ranges, and drivers of the outcome variables. Internal cloud 502 further includes data collector/hashing service 516. Data collector/hashing service 516 is operable to receive queries for new or existing applications via application gateway 508 and encrypt the personally identifiable information via asymmetric encryption.

Client infrastructure 540 includes application gateway 508 where an underwriting party may submit queries for insurance or financial product applications from remote client devices. The queries may comprise applicant data including personal identifying information (such as name, age, and date of birth), policy information, underwriting information, an outcome variable for life expectancy as calculated from the underwriters' decision, and actuarial assumptions for a person in an underwriting class and of that age. Client devices may comprise general purpose computing devices (e.g., personal computers, mobile devices, terminals, laptops, personal digital assistants (PDA), cell phones, tablet computers, or any computing device having a central processing unit and memory unit capable of connecting to a network). Client devices may also comprise a graphical user interface (GUI) or a browser application provided on a display (e.g., monitor screen, LCD or LED display, projector, etc.).

A client device may also include or execute an application to communicate textual content, such as, for example, textual content, multimedia content, or the like. A client device may also include or execute an application to perform a variety of possible tasks. A client device may include or execute a variety of operating systems, including a personal computer operating system, such as a Windows, Mac OS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. The term "social network" refers generally to a network of individuals, such as acquaintances, friends, family, colleagues, or co-workers, coupled via a communications network or via a variety of sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

Data collector/hashing service 516 is further operable to retrieve data from various sources of data such as third party services including RX database 510, consumer data 512, and credit data 514, and from public web queries 504 on external cloud 530. RX database 510 includes medical prescription records and health histories. Consumer data 512 includes retail purchasing information (e.g., from Ebay, Amazon, Starbucks, Seamless, Groupon, OpenTable, etc.), services (e.g., Netflix, Nexus Lexis), memberships (e.g., gym, automobile, and professional associations such as IEEE). Public web queries 504 may include searches for "hits" associated with applicants' names on the Internet, driving records, criminal records, and applicants' social network profiles (e.g., LinkedIn, Facebook, Twitter, etc.). Several features of applicants may be extracted from the RX database 510, consumer data 512, credit data 514, and from public web queries 504.

The information provided in the application queries and the retrieved data may be transmitted to prediction engine 518 for analysis and prediction. Prediction engine 518 includes a plurality of models and is operable to input the application data and the retrieved data into the models. The prediction engine 518 summarizes and combines results from the ensemble of models to generate one or more outcome variables and provide an uncertainty range. The prediction engine 518 further operable to determine drivers of the outcome variables by varying certain features and determining which of the varied features are major contributors to the outcome variables. After completion of analysis and prediction by prediction engine 518, results (outcome variables, uncertainty ranges, and drivers) may be uploaded to collector/hashing service 516 to return the result to application gateway 508. The external cloud 530 further includes billing and customer backend 506. Billing and customer backend 506 is operable to track the progress of application queries and notify application gateway 508 when outcome data is ready.

Figure 6:
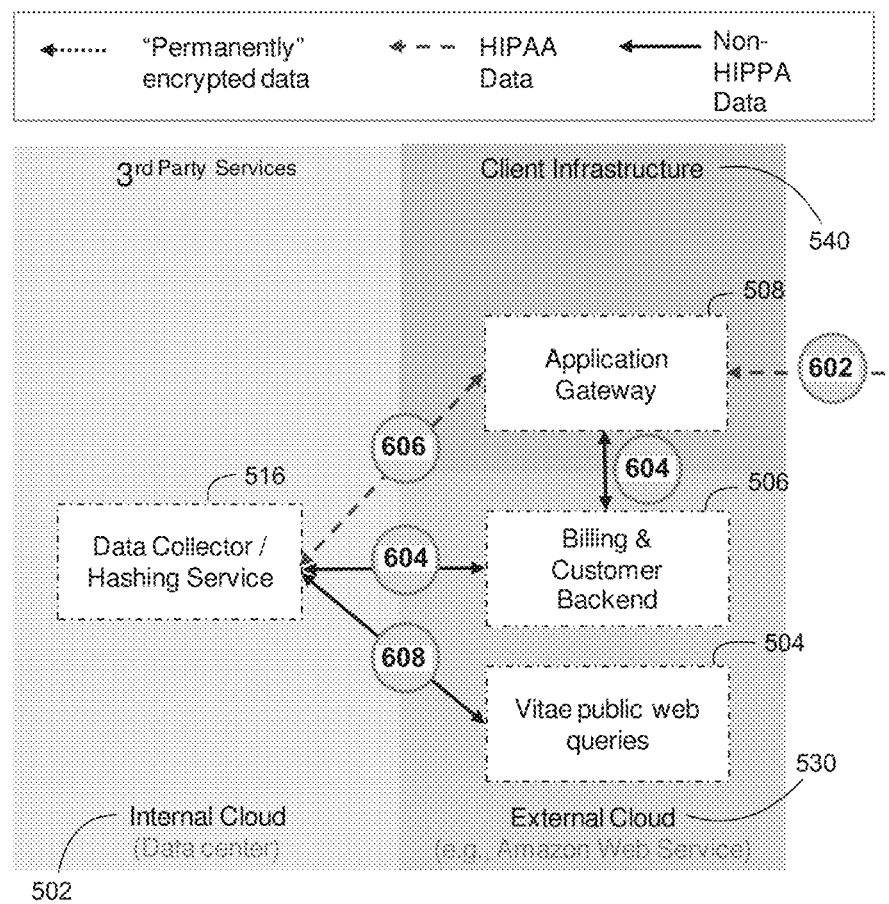
FIG. 6 and FIG. 7 illustrate data flow diagrams of a system for predicting outcomes for insurance and financial product applications according to an embodiment of the present invention.
Figure 7:
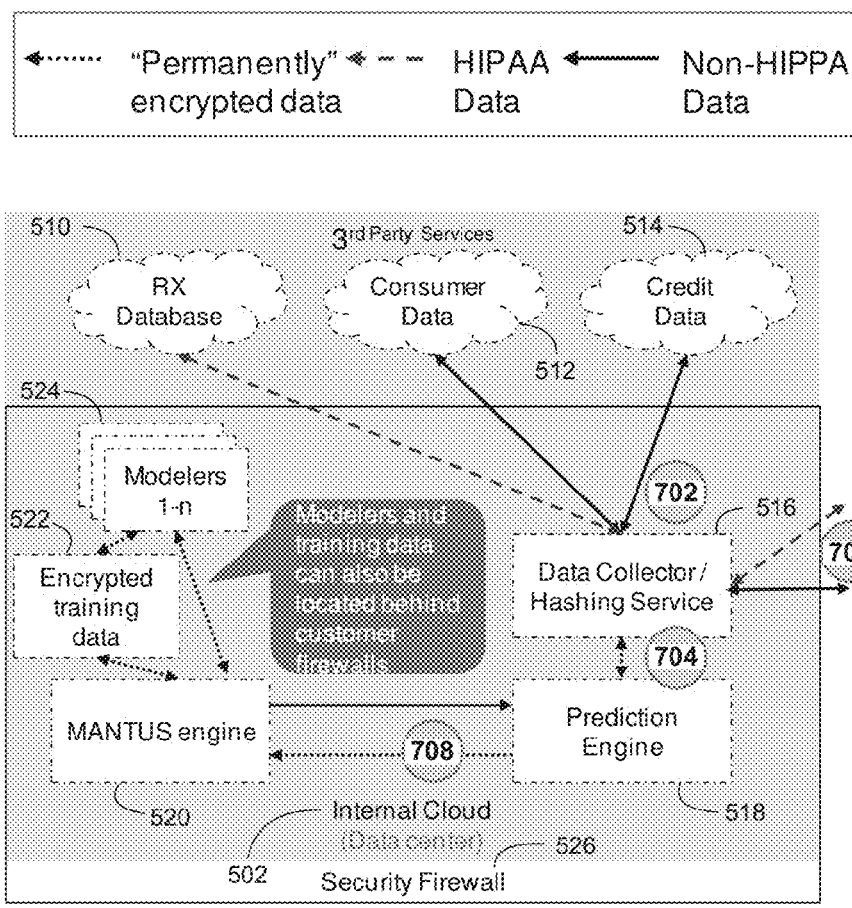

FIG. 6 and FIG. 7 present data flow diagrams of a system for predicting outcomes for insurance and financial product applications according to an embodiment of the present invention. Referring to FIG. 6, application data is sent from a client device of an underwriter to application gateway server 508 on client infrastructure 540, step 602. Application data includes personal identifying information (such as name, age, and date of birth), policy information, underwriting information, an outcome variable for life expectancy as calculated from the underwriters' decision, and actuarial assumptions for a person in an underwriting class and of that age. A job for the application data is created and progress is tracked throughout the cycle by billing and customer backend 506, step 604. Tracking the progress of the job further includes notifying application gateway 508 when the job is complete and ready for transmission to the underwriter. The application data is uploaded from the application gateway server 508 to data collector/hashing service 516, step 606. Application data uploaded to the data collector/hashing service 516 may be uploaded via secured transfer. In a next step 608, data collector launches web queries for additional data lookup. The web queries may include searching public data (e.g., available on the Internet) associated with applicants in connection with the application data.

Referring to FIG. 7, data collector/hashing service 516 is configured to query third party services (RX database 510, consumer data 512, and credit data 514) to acquire additional data, step 702. Personal identification information contained in the additional data may be hashed or encrypted by data collector/hashing service 516. Prediction engine runs the ensemble of models and returns the result(s) to data collector/hashing service 516, step 704. Billing and customer backend 506 receives status reports on the job, while the application gateway 508 receives the result(s) from data collector/hashing service 516, step 706. Encrypted data (application data and additional data) is sent to MANTUS engine 520 for model re-building, step 708.

Figure 8:
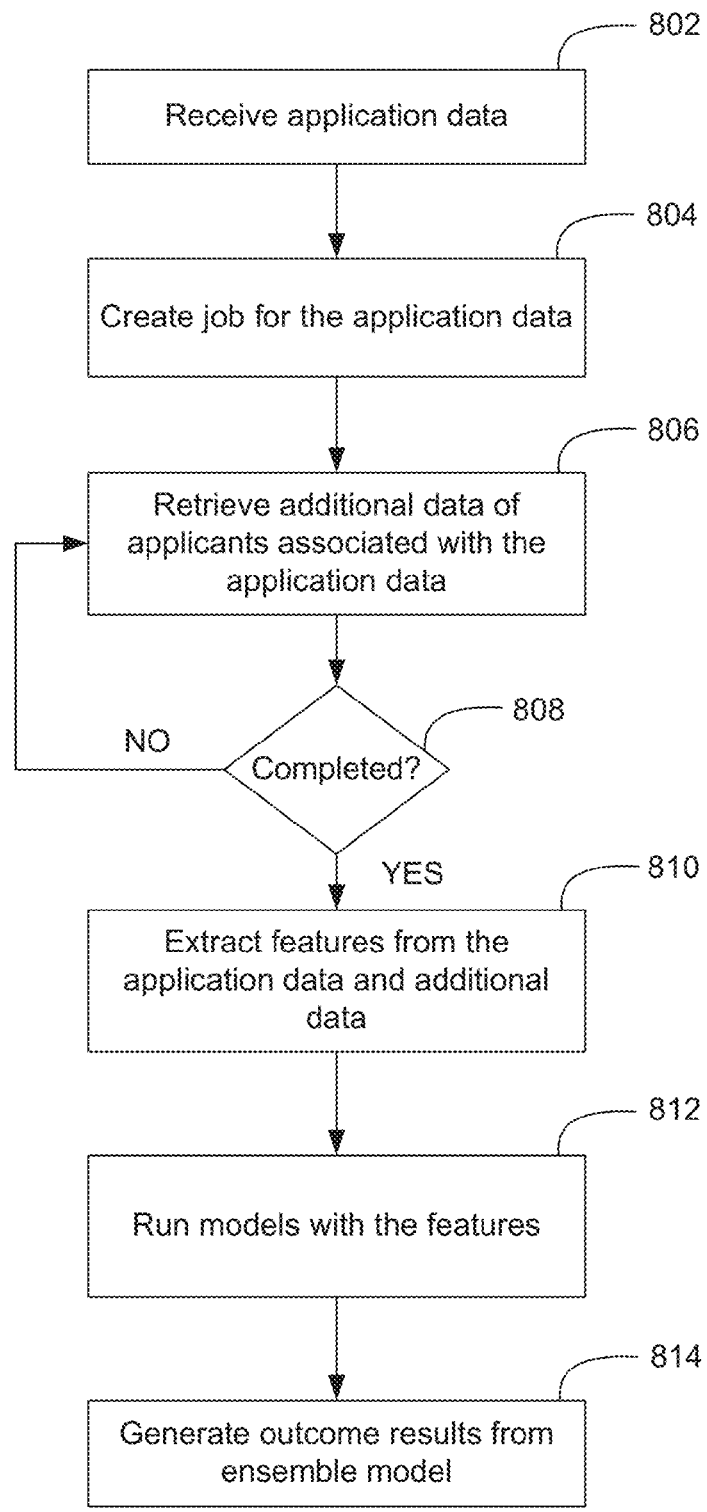
FIG. 8 illustrates a flowchart of a method for predicting an outcome based on an aggregate model according to an embodiment of the present invention.

FIG. 8 illustrates a flowchart of a method for predicting an outcome based on an aggregate model according to an embodiment of the present invention. A prediction server receives application data, step 802. Application data may include personal identifying information (such as name, age, and date of birth), policy information, underwriting information, an outcome variable for life expectancy as calculated from the underwriters' decision, and actuarial assumptions for a person in an underwriting class and of that age. A job is created for the application data, step 804. The job comprises processing of the application data to produce an outcome prediction by the prediction server.

Additional data of applicants associated with the application data is retrieved, step 806. The additional data may include prescription records, consumer data, credit data, driving records, medical records, social networking/media profiles, and any other information useful in characterizing an individual for an insurance or credit (as well as other financial products) applications. Progress of the retrieval of additional data is monitored, step 808. Upon completion of the additional data retrieval, features from the application data and the additional data are extracted, step 810. The features are provided as inputs to the ensemble of models stored on the prediction server. Each of the models are run with the extracted features 812. Outcome results are generated from the ensemble model, step 814. The results include outcome variables, uncertainty ranges, and drivers. According to one embodiment, a combination of at least one of an outcome variable or score, certainty/uncertainty ranges, drivers, and lack of data may be translated to an underwriting, credit, or risk prediction by using a translation table or other rules based engine.

FIGS. 1 through 8 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

The invention claimed is:

1. A computer implemented method for determining a likelihood of a certain financial, insurance or health outcome, the method comprising:
   receiving at one or more modeling servers, data from underwriting databases of one or more underwriting parties, the data including information from existing insurance policies;
   generating by the modeling servers, for each of the plurality of underwriting parties, at least one dataset and sub-datasets of the at least one dataset from the data, wherein generating at least one dataset and sub-datasets of the at least one dataset includes selecting sets of features using iterative feature addition or recursive feature elimination;
   training, via the one or more modeling servers, sets of models of a given learning technique for each of the sub-datasets;
   determining by the modeling servers, overall weighting of each model within the sets of models for each of the sub-datasets; and
   transmitting to a prediction server over a communication network, the sets of models, the overall weighting of each model and a number of examples provided from the data for each of the datasets, the prediction server configured to determine relative weights of each of the sets of models based on the number of examples, combine the sets of models into an ensemble model, receive new application data from underwriting servers, and predict at least one of outcome variables, an uncertainty factor for the outcome variables, and drivers of the outcome variables based on the new application data.

2. The method of claim 1 wherein generating at least one dataset and sub-datasets from the data for each of the plurality of underwriting parties includes at least one of choosing sub-datasets from the datasets with replacement, and choosing a family of feature sets within each dataset that provide predictive power for the combined sets of models.

3. The method of claim 1 further comprising selecting the given learning technique for each of the datasets from a selection of support vector machines, tree-based techniques, artificial neural networks, and random forest learning models.

4. The method of claim 1 further comprising selecting the given learning technique for each of the datasets from a selection of supervised and unsupervised machine learning algorithms.

5. The method of claim 1 wherein training the sets of models includes:
   testing each model for accuracy utilizing a test set of data omitted from each sub-dataset of each dataset; and
   discarding models with insufficient predictive power based on the testing.

6. The method of claim 1 wherein generating at least one dataset and sub-datasets of the at least one dataset includes selecting sets of features based on one of guaranteed uniformity of feature sets across the datasets, and a lack of a large number of information bearing features.

7. The method of claim 1 further comprising calculating a mode or median of the at least one of the outcome variables.

8. The method of claim 1 further comprising:
identifying at least one of missing, erroneous, and poorly defined data points from the data; and
training the sets of models based on the identification of the data points from the data that are at least one of missing, erroneous, and poorly defined.

9. The method of claim 1 wherein the sets of models, outcome variables, uncertainty factors, and drivers are used to target marketing of financial or insurance products to a specific class or type of customer.

10. The method of claim 1 wherein the data includes data produced by wearable technologies.

11. The method of claim 1 wherein the training includes data produced by public and social networking data sources.

12. The method of claim 1 comprising generating the uncertainty factor based on a lack of information about a customer or potential risks.

13. The method of claim 1 wherein the uncertainty factor is an input to a decision on whether or not to reject an insurance application.

14. The method of claim 1 wherein the uncertainty factor is an input into a decision on whether or not to do additional underwriting processes on an applicant for an insurance application.

15. The method of claim 1 wherein the uncertainty factor is used as an input to credit or insurance underwriting.

16. The method of claim 1 where the uncertainty factor is represented on a bar chart to illustrate the uncertainty factor.

17. The method of claim 1 further comprising translating a combination of at least one of the outcome variables, the uncertainty factor for the outcome variables, the drivers, and a lack of data to one of an underwriting, credit, and risk prediction by using a translation table or a rules based engine.

18. A system for determining a likelihood of a certain financial, insurance or health outcome, the system comprising:
one or more computing devices configured to:
receive data from a plurality of underwriting parties, the data including information from existing insurance policies,
generate at least one dataset and sub-datasets of the at least one dataset from the data for each of the plurality of underwriting parties,
perform an operation on the data comprising at least one of: (i) pre-process the data to anonymize information that could identify a person or entity, (ii) normalize the data prior to or during generation of the at least one dataset and sub-datasets of the at least one dataset, (iii) clean the data to remove and correct potentially erroneous data, (iv) and encrypt or hash the data,
train sets of models of a given learning technique for each of the sub-datasets,
determine overall weighting of each model within the sets of models for each of the sub-datasets, and
transmit to a central server over a communication network, the sets of models, the overall weighting of each model and a number of examples provided from the data for each of the datasets; and
the central server configured to determine relative weights of each of the sets of models based on the number of examples, combine the sets of models into an ensemble model, receive new application data, and predict at least one of outcome variables, an uncertainty factor for the outcome variables, and drivers of the outcome variables based on the new application data.

19. A computer implemented method for determining a likelihood of a certain financial, insurance or health outcome, the method comprising:
receiving at one or more modeling servers, data from underwriting databases of one or more underwriting parties, the data including information from existing insurance policies;
generating by the modeling servers, for each of the plurality of underwriting parties, at least one dataset and sub-datasets of the at least one dataset from the data;
training, via the one or more modeling servers, sets of models of a given learning technique for each of the sub-datasets;
determining by the modeling servers, overall weighting of each model within the sets of models for each of the sub-datasets, where the overall weighting of each model within the sets of models for each of the sub-datasets is related to:
a number of records represented in each sub-dataset of a given dataset by a power law, or
its predictive power as determined by regression assignment of weights based on accuracy on a test set of data; and
transmitting to a prediction server over a communication network, the sets of models, the overall weighting of each model and a number of examples provided from the data for each of the datasets, the prediction server configured to determine relative weights of each of the sets of models based on the number of examples, combine the sets of models into an ensemble model, receive new application data from underwriting servers, and predict at least one of outcome variables, an uncertainty factor for the outcome variables, and drivers of the outcome variables based on the new application data.

20. A computer implemented method for determining a likelihood of a certain financial, insurance or health outcome, the method comprising:
receiving at one or more modeling servers, data from underwriting databases of one or more underwriting parties, the data including information from existing insurance policies;
generating by the modeling servers, for each of the plurality of underwriting parties, at least one dataset and sub-datasets of the at least one dataset from the data;
training, via the one or more modeling servers, sets of models of a given learning technique for each of the sub-datasets;
determining by the modeling servers, overall weighting of each model within the sets of models for each of the sub-datasets;
transmitting to a prediction server over a communication network, the sets of models, the overall weighting of each model and a number of examples provided from the data for each of the datasets, the prediction server configured to determine relative weights of each of the sets of models based on the number of examples, combine the sets of models into an ensemble model, receive new application data from underwriting servers, and predict at least one of outcome variables, an uncertainty factor for the outcome variables, and drivers of the outcome variables based on the new application data, wherein the outcome variables are at least one of categorical variables, continuous outcome variables, and binary variables; and determining the uncertainty factor by:
  taking an arithmetic mean of continuous outcome variables and calculating at least one of variance, standard deviation, outliers, range, distribution, and span between given percentiles, or
  converting at least one categorical variable into continuous outcome variables, taking an arithmetic mean of the continuous outcome variables, and calculating at least one of variance, standard deviation, outliers, range, distribution, or span between given percentiles.

21. A computer implemented method for determining a likelihood of a certain financial, insurance or health outcome, the method comprising:
  receiving at one or more modeling servers, data from underwriting databases of one or more underwriting parties, the data including information from existing insurance policies;
  generating by the modeling servers, for each of the plurality of underwriting parties, at least one dataset and sub-datasets of the at least one dataset from the data;
  training, via the one or more modeling servers, sets of models of a given learning technique for each of the sub-datasets;
  determining by the modeling servers, overall weighting of each model within the sets of models for each of the sub-datasets; and
  transmitting to a prediction server over a communication network, the sets of models, the overall weighting of each model and a number of examples provided from the data for each of the datasets, the prediction server configured to determine relative weights of each of the sets of models based on the number of examples, combine the sets of models into an ensemble model, receive new application data from underwriting servers, and predict at least one of outcome variables, an uncertainty factor for the outcome variables, and drivers of the outcome variables based on the new application data,
    wherein the prediction server is further operable to perform a sensitivity analysis using the combined sets of ensemble models to determine which features are a largest of the drivers of the outcome variables.

22. The method of claim 21 further comprising:
  perturbing a given outcome variable by one of a preset, human-selected, and algorithmically-selected amount or number of gradations; and
  determining an effect of the perturbation on the outcome variables.

23. A computer implemented method for determining a likelihood of a certain financial, insurance or health outcome, the method comprising:
  receiving at one or more modeling servers, data from underwriting databases of one or more underwriting parties, the data including information from existing insurance policies;
  generating by the modeling servers, for each of the plurality of underwriting parties, at least one dataset and sub-datasets of the at least one dataset from the data;
  performing an operation on the data comprising at least one of: (i) pre-processing the data to anonymize information that could identify a person or entity, (ii) normalizing the data prior to or during the generation of the at least one dataset and sub-datasets of the at least one dataset, (iii) cleaning the data to remove and correct potentially erroneous data, (iv) and encrypting or hashing the data;
  training, via the one or more modeling servers, sets of models of a given learning technique for each of the sub-datasets;
  determining by the modeling servers, overall weighting of each model within the sets of models for each of the sub-datasets; and
  transmitting to a prediction server over a communication network, the sets of models, the overall weighting of each model and a number of examples provided from the data for each of the datasets, the prediction server configured to determine relative weights of each of the sets of models based on the number of examples, combine the sets of models into an ensemble model, receive new application data from underwriting servers, and predict at least one of outcome variables, an uncertainty factor for the outcome variables, and drivers of the outcome variables based on the new application data.

24. The method of claim 23 wherein cleaning the data includes augmenting the data with additional information.

25. The method of claim 23 wherein cleaning the data includes replacing missing data fields with values including one of a mean of values for the missing data fields in a dataset, randomly selected, and median values for the missing data fields from a given sub-dataset.

26. A computer implemented method for determining a likelihood of a certain financial, insurance or health outcome, the method comprising:
  receiving at one or more modeling servers, data from underwriting databases of one or more underwriting parties, the data including information from existing insurance policies;
  generating by the modeling servers, for each of the plurality of underwriting parties, at least one dataset and sub-datasets of the at least one dataset from the data;
  training, via the one or more modeling servers, sets of models of a given learning technique for each of the sub-datasets;
  determining by the modeling servers, overall weighting of each model within the sets of models for each of the sub-datasets; and
  transmitting to a prediction server over a communication network, the sets of models, the overall weighting of each model and a number of examples provided from the data for each of the datasets, the prediction server configured to determine relative weights of each of the sets of models based on the number of examples, combine the sets of models into an ensemble model, receive new application data from underwriting servers, and predict at least one of outcome variables, an uncertainty factor for the outcome variables, and drivers of the outcome variables based on the new application data, wherein the sets of models, outcome variables, uncertainty factors, and drivers are used to inform one of an offer of credit, an offer of insurance, marketing of financial or insurance products to a consumer, marketing of financial or insurance products and activating features of those products to an existing customer, fraud detection during or after an evaluation of an application, and an offer of incentives or dividends for behavior after an extension of credit or insurance.

* * * * *